UNITED STATES PATENT OFFICE.

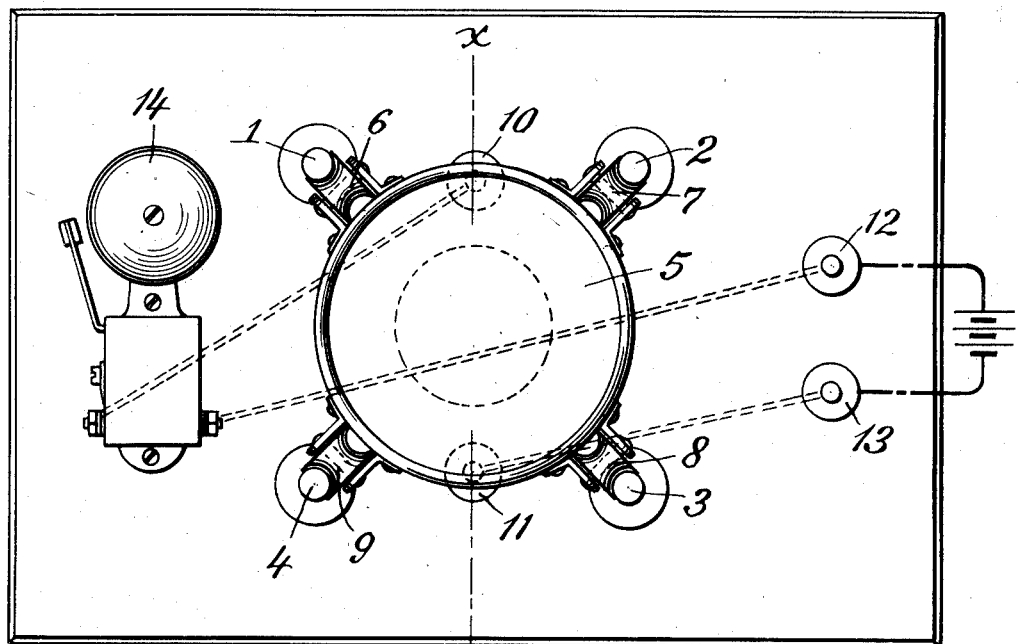

JEROME ALEXANDER, OF NEW YORK, N. Y.

METHOD OF AND APPARATUS FOR TESTING JELLY.

No. 882,731.      Specification of Letters Patent.      Patented March 24, 1908.

Application filed May 5, 1906. Serial No. 315,410.

*To all whom it may concern:*

Be it known that I, JEROME ALEXANDER, a citizen of the United States, and a resident of the borough of Manhattan, city, county, and State of New York, have invented certain new and useful Improvements in Methods of and Apparatus for Testing Jelly, of which the following is a specification, reference being had to the accompanying drawings, which form a part thereof.

My invention relates to that class of devices employed for testing jellies, gelatin, gum, glue or the like, and more particularly jellies which are formed in the manufacture of glue, and has for its object the provision of a suitable apparatus for ascertaining the degree of resistance to change of form or the "strength" of jellies in such a manner that the varying degrees may be accurately known and measured and the results of the tests can be tabulated according to a definite standard.

My improved apparatus consists essentially of means for measuring the amount of compression of a block of jelly wholly or partially free from restraining walls, provision being made for making these measurements according to a fixed standard.

Referring to the drawings, Figure 1, is a plan view of an embodiment of my device which I have employed in actual practice with very satisfactory results. Fig. 2 is a vertical section of the apparatus taken along the line X X of Fig. 1, illustrating the mode of operation of the device. Fig. 3 is a cross section of a block of jelly inclosed in its mold. Fig. 4 is a perspective view of this mold with the bottom removed.

In Figs. 1 and 2, 1, 2, 3 and 4 are upright standards or rods of metal or other suitable material, preferably arranged to form the four corners of a square. These uprights are mounted upon a suitable base such as the wood panel shown. 5 is a cylindrical vessel with a closed bottom and an open top arranged to slide vertically upon the uprights 1, 2, 3 and 4. The bearings between this vessel 5 and the uprights should be made as nearly frictionless as possible, and to accomplish this result I provide roller bearing 6, 7, 8 and 9. The vessel 5 is constructed of some metal which is a conductor of electricity for the reasons which will appear hereafter. Suitably placed beneath the edges of the vessel 5 are two vertically adjustable uprights 10 and 11, the bases of which are connected in an open electric circuit. I place upon one end of the panel 2 binding posts 12 and 13 which are adapted to be connected to the terminals of battery or any convenient source of suitable electric current. The binding post 13 is connected directly to the upright 11, while the binding post 12 is connected to one terminal of an electric bell 14 or other suitable indicating device. The other terminal of the electric bell is connected to the upright 10. The circuit containing the bell is therefore open between 10 and 11 and is not closed until the vessel 5 makes contact with these uprights and completes the circuit.

The method of testing the strength of jellies by my improved apparatus is as follows: I prepare a block of jelly in any suitable manner, as, for example, by filling a cup 15 (Fig. 3). This cup I prefer to make in the shape of a truncated cone having an open top and a removable tight fitting bottom. After the cup has been filled it is inverted upon the panel beneath the vessel 5 and the cup removed, leaving the block of jelly as shown in Fig. 2. This operation can easily be accomplished by dipping the cup into hot water for an instant and removing the bottom. The vessel 5 is then allowed to descend upon the block, and some easily graduated weight, such as shot, introduced until the block of jelly is compressed sufficiently to allow the vessel to rest upon the tops of the uprights 10 and 11 which have previously been adjusted as desired. When the vessel 5 touches these two uprights the electric circuit is closed and the bell signals to the operator that a previously determined degree of compression has taken place.

It will be obvious that by proper proportioning of the size and shape of the cup which forms the mold for the block of jelly and by a suitable adjustment of the uprights 10 and 11, measurements of jelly strength can be taken according to any desired standard, and the weight of the vessel 5 plus the added weight will bear a definite relation to the comparative jelly strength.

My invention can be embodied in many widely differing forms, the one shown and described being chosen merely because it is one which I have actually used with very satisfactory results. I do not wish, however, to be understood as limiting myself to this precise construction, but desire to cover broadly the essential features as set forth in the claims.

Having described my invention, what I claim is:

1. The method of testing jelly, which consists in subjecting a block of jelly to compression in one direction while it is free to expand in another direction, and increasing the compression until the dimension of the block in the direction of compression is decreased to a predetermined degree.

2. In a jelly-testing apparatus the combination of a weighted carrier having a bottom forming a conductor of electricity, vertical guides forming bearings therefor, vertically adjustable uprights beneath said carrier, the said uprights forming the terminals of an electric circuit containing an indicating device, the said electric circuit being adapted to be closed by the contact of said weight-holding cup with said uprights.

3. In a jelly-testing device, the combination of a vertically-traveling carrier adapted to be weighted, provided with bearings engaging the standards laterally supporting said carrier, said standards mounted upon a common base, provided with two adjustable screws adapted to limit the descent of said carrier and to close an electric circuit, said circuit including therein a signaling device adapted to be operated electrically by the closing of said circuit.

JEROME ALEXANDER.

Witnesses:
NICHOLAS O. MCMANUS,
PHILIP J. JACOBS.